(12) United States Patent  
August et al.

(10) Patent No.: US 9,069,933 B1  
(45) Date of Patent: Jun. 30, 2015

(54) SECURE, NETWORKED PORTABLE STORAGE DEVICE

(75) Inventors: Jason August, Toronto (CA); John Stevens, Stratham, NH (US); Paul Waterhouse, Copetown (CA)

(73) Assignee: Visible Assets, Inc., Mississauga, Ontario (CA)

( * ) Notice: Subject to any disclaimer, the term of this patent is extended or adjusted under 35 U.S.C. 154(b) by 2412 days.

(21) Appl. No.: 11/754,261

(22) Filed: May 25, 2007

Related U.S. Application Data

(63) Continuation-in-part of application No. 11/633,751, filed on Dec. 4, 2006, which is a continuation-in-part of application No. 11/162,907, filed on Sep. 28, 2005, now Pat. No. 7,626,505.

(51) Int. Cl.
| | |
|---|---|
| *G06F 7/04* | (2006.01) |
| *G06F 11/00* | (2006.01) |
| *H04L 29/06* | (2006.01) |
| *G06F 21/10* | (2013.01) |
| *G11B 20/00* | (2006.01) |

(Continued)

(52) U.S. Cl.
CPC .......... *G06F 21/10* (2013.01); *G11B 20/00086* (2013.01); *G06F 21/6218* (2013.01); *G06F 21/86* (2013.01)

(58) Field of Classification Search
CPC ..... G06F 21/10; G06F 21/86; G06F 21/6218; G11B 20/00086
USPC ....................................... 726/26, 34; 713/165
See application file for complete search history.

(56) References Cited

U.S. PATENT DOCUMENTS

| | | |
|---|---|---|
| 4,190,830 A | 2/1980 | Bell |
| 4,750,197 A | 6/1988 | Denekamp et al. |

(Continued)

FOREIGN PATENT DOCUMENTS

| | | |
|---|---|---|
| WO | 9608760 | 3/1996 |
| WO | 02071382 | 9/2002 |
| WO | 2006035401 A2 | 4/2006 |

OTHER PUBLICATIONS

B. Liblit, A. Aiken, A.X. Zheng, and M.I. Jordan, "Bug Isolation Via Remote Program Sampling," in ACM SIGPLAN PLDI 2003.

(Continued)

*Primary Examiner* — Aravind Moorthy  
(74) *Attorney, Agent, or Firm* — Larson & Anderson, LLC

(57) ABSTRACT

A secure, networked portable storage device includes: a secure data storage section; a program storage section including a security program operatively connected to the secure data storage section, wherein the security program is operable to selectively enable and disable access to the secure data storage section; a device antenna operable at a low radio frequency not exceeding one megahertz; a transceiver operatively connected to the device antenna, the transceiver operable to receive radio signals at the low radio frequency and generate data signals at the said low radio frequency, in response thereto; a programmable microprocessor operatively coupled with the transceiver and the program storage section, the microprocessor configured for controlling operation of the program storage section and to cause the transceiver to emit an identification signal; and a connector for enabling an electrical connection between the portable storage device and another device, wherein the connector and the secure data storage section are not operatively connected.

38 Claims, 15 Drawing Sheets

(51) Int. Cl.
G06F 21/62 (2013.01)
G06F 21/86 (2013.01)

(56) References Cited

U.S. PATENT DOCUMENTS

| | | |
|---|---|---|
| 4,782,341 A | 11/1988 | Gray |
| 4,792,796 A | 12/1988 | Bradshaw et al. |
| 4,821,291 A | 4/1989 | Stevens et al. |
| 4,879,756 A | 11/1989 | Stevens et al. |
| 4,937,586 A | 6/1990 | Stevens et al. |
| 4,961,028 A | 10/1990 | Tanaka |
| 5,177,432 A | 1/1993 | Waterhouse et al. |
| 5,245,534 A | 9/1993 | Waterhouse et al. |
| 5,260,694 A | 11/1993 | Remahl |
| 5,374,815 A | 12/1994 | Waterhouse et al. |
| 5,517,188 A | 5/1996 | Carroll et al. |
| 5,519,381 A | 5/1996 | Marsh et al. |
| 5,532,465 A | 7/1996 | Waterhouse et al. |
| 5,898,370 A | 4/1999 | Reymond |
| 5,920,287 A | 7/1999 | Belcher et al. |
| 5,920,576 A | 7/1999 | Eaton et al. |
| 5,969,595 A | 10/1999 | Schipper et al. |
| 6,027,027 A | 2/2000 | Smithgall |
| 6,127,917 A | 10/2000 | Tuttle |
| 6,127,976 A | 10/2000 | Boyd et al. |
| 6,164,551 A | 12/2000 | Altwasser |
| 6,195,006 B1 | 2/2001 | Bowers et al. |
| 6,208,235 B1 | 3/2001 | Trontelj |
| 6,222,452 B1 | 4/2001 | Ahlstrom et al. |
| 6,236,911 B1 | 5/2001 | Kruger |
| 6,280,544 B1 | 8/2001 | Fox et al. |
| 6,294,997 B1 | 9/2001 | Paratore et al. |
| 6,318,636 B1 | 11/2001 | Reynolds et al. |
| 6,320,509 B1 | 11/2001 | Brady et al. |
| 6,329,944 B1 | 12/2001 | Richardson et al. |
| 6,335,688 B1 | 1/2002 | Sweatte |
| 6,354,493 B1 | 3/2002 | Mon |
| 6,377,203 B1 | 4/2002 | Doany |
| 6,452,340 B1 | 9/2002 | Morrissey, Jr. et al. |
| 6,496,806 B1 | 12/2002 | Horwitz et al. |
| 6,512,478 B1 | 1/2003 | Chien |
| 6,624,752 B2 | 9/2003 | Klitsgaard et al. |
| 6,662,078 B1 | 12/2003 | Hardgrave et al. |
| 6,696,954 B2 | 2/2004 | Chung |
| 6,720,883 B2 | 4/2004 | Kuhr et al. |
| 6,724,308 B2 | 4/2004 | Nicholson |
| 6,745,027 B2 | 6/2004 | Twitchell et al. |
| 6,785,739 B1 | 8/2004 | Tutt et al. |
| 6,927,687 B2 | 8/2005 | Carrender |
| 7,023,338 B1 | 4/2006 | Foth |
| 7,028,861 B2 | 4/2006 | Sayers et al. |
| 7,049,963 B2 | 5/2006 | Waterhouse et al. |
| 7,193,515 B1 | 3/2007 | Roberts et al. |
| 7,242,301 B2 | 7/2007 | August et al. |
| 7,327,250 B2 | 2/2008 | Harvey |
| 2001/0048361 A1 | 12/2001 | Mays et al. |
| 2002/0003493 A1 | 1/2002 | Durst et al. |
| 2002/0041235 A1 | 4/2002 | Van Horn et al. |
| 2002/0084904 A1 | 7/2002 | De La Huerga |
| 2003/0055689 A1 | 3/2003 | Block et al. |
| 2004/0053641 A1 | 3/2004 | Leung et al. |
| 2004/0066366 A1 | 4/2004 | Jung et al. |
| 2004/0069849 A1 | 4/2004 | Stevens et al. |
| 2004/0134620 A1 | 7/2004 | Soeborg |
| 2004/0149822 A1 | 8/2004 | Stevens et al. |
| 2004/0205350 A1 | 10/2004 | Waterhouse et al. |
| 2004/0217866 A1 | 11/2004 | Copeland et al. |
| 2005/0029345 A1 | 2/2005 | Waterhouse et al. |
| 2005/0043850 A1 | 2/2005 | Stevens et al. |
| 2005/0043886 A1 | 2/2005 | Stevens et al. |
| 2005/0083213 A1 | 4/2005 | Stevens et al. |
| 2005/0086983 A1 | 4/2005 | Stevens et al. |
| 2005/0099309 A1 | 5/2005 | Hum et al. |
| 2005/0121659 A1 * | 6/2005 | Tanaka et al. ............ 257/4 |
| 2005/0149226 A1 | 7/2005 | Stevens et al. |
| 2005/0205817 A1 | 9/2005 | Marcichow et al. |
| 2005/0251330 A1 | 11/2005 | Waterhouse et al. |
| 2006/0124662 A1 | 6/2006 | Reynolds et al. |
| 2006/0128023 A1 | 6/2006 | Waterhouse et al. |
| 2006/0164232 A1 | 7/2006 | Waterhouse et al. |
| 2006/0232417 A1 | 10/2006 | August et al. |
| 2009/0313689 A1 * | 12/2009 | Nystrom et al. ............ 726/9 |

OTHER PUBLICATIONS

Depauw et al., "Drive-By Analysis of Running Programs," 23rd International Conference on Software Engineering, ICSE 2001.
Arnold et al. in "On-line Profiling and Feedback Directed Optimization of Java," Rutgers University, 2002.
Arnold and Sweeney, "Approximating the Calling Context Tree Via Sampling," Technical report, IBM Research, 2000.
Lindsay, Jeffrey et al. "Cascading RFID Tags", Dec. 23, 2003, pp. 1-10, West Henrietta, NY.

* cited by examiner

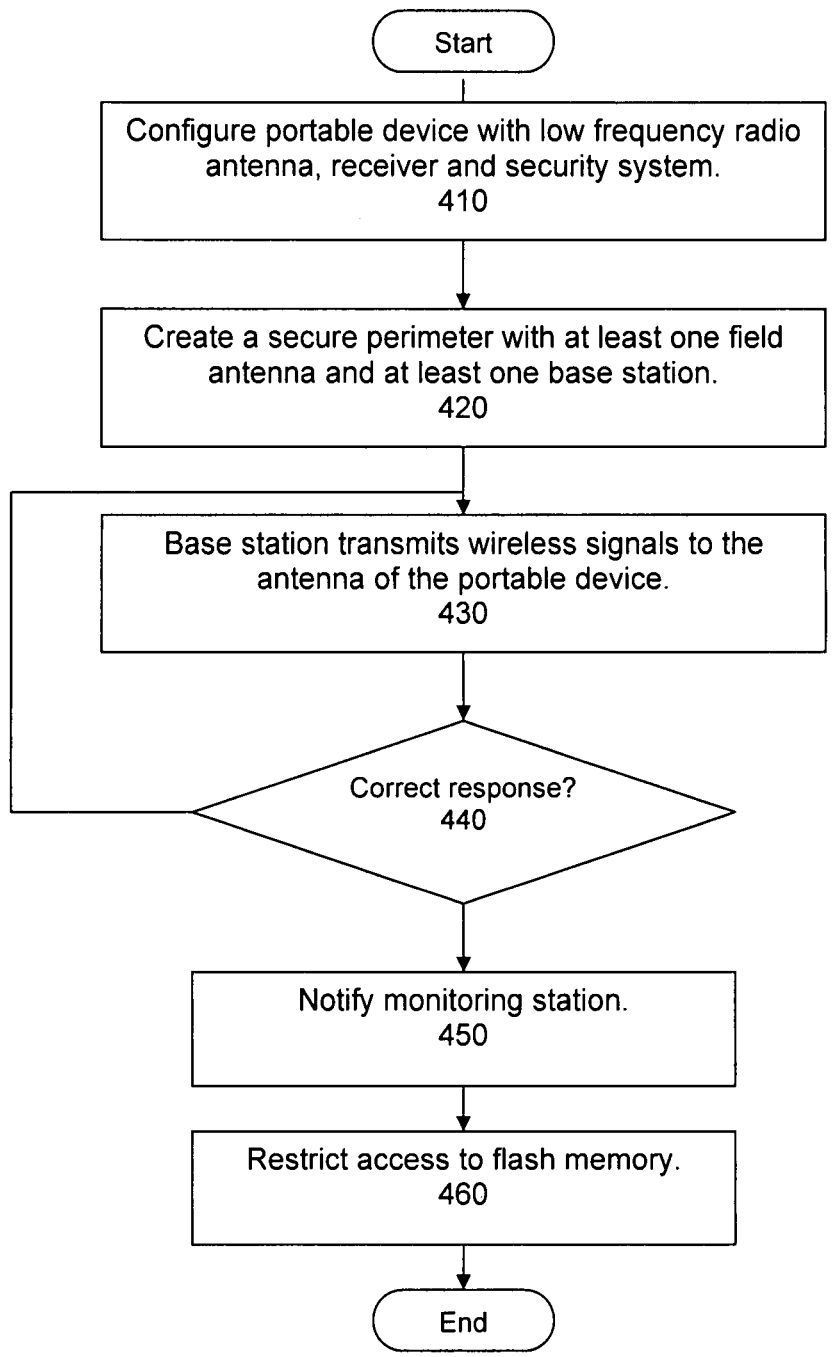

SECURE, NETWORKED PORTABLE STORAGE DEVICE

CROSS-REFERENCE TO RELATED APPLICATIONS

This application is a continuation-in-part of U.S. application Ser. No. 11/633,751, filed Dec. 4, 2006, which is in turn a continuation-in-part of U.S. application Ser. No. 11/162,907, "RF Tags for Tracking and Locating Travel Bags," filed Sep. 28, 2005 now U.S. Pat. No. 7,626,505. This application also claims priority from U.S. application Ser. No. 11/462,844, "Networked RF Tag for Tracking Baggage," filed on Aug. 7, 2006.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

Not Applicable.

TRADEMARKS

RuBee™ is a registered trademark of Visible Assets, Inc. of the United States. Other names used herein may be registered trademarks, trademarks or product names of Visible Assets, Inc. or other companies.

FIELD OF THE INVENTION

The invention disclosed broadly relates to the field of portable devices and more particularly relates to the field of securing portable devices such as flash drives or portable memory of various types, including laptop computers and hard drives.

BACKGROUND OF THE INVENTION

Portable devices such as the ubiquitous flash drives have become commonplace in today's fast-paced culture, replacing their aging floppy disk ancestors. Their ease of use and large storage capacity, combined with their small size and price, make them an ideal tool for retrieving and transporting data from one system to another. Many of these portable devices are also known as USB (universal serial bus) drives because they have a USB plug for connecting with a USB port on a personal computer, laptop, or personal digital assistant. Referring to FIG. 1 there is shown an illustration of an exemplary flash drive 100. The flash drive 100 is generally nothing more than a rewritable memory chip and a standard USB plug housed in a plastic case the size of a thumb (hence the moniker "thumb drive"). Accessing data from the flash drive 100 on a laptop requires not much more than plugging the USB connector 102 of the flash drive 100 into a USB port in a laptop.

Unfortunately, this convenience has created problems due to the ease with which data from a flash drive can become lost or fall into the wrong hands. Many organizations have sought to curb these security risks by adopting policies regarding the use of flash drives. Although these security policies were seen as a step in the right direction, their impotence was brought to light in October of 2006 when a contract employee at Los Alamos National Laboratory took home a flash drive containing classified government information, in violation of lab policy. Also in 2006, stolen U.S. military flash drives containing data about military operations and soldiers were discovered at an Afghan street market in Bagram, Afghanistan.

These and other reports of flash drive security risks have driven some organizations to ban their use altogether. Information technology (IT) managers disable the USB ports on the company computers so that the flash drives cannot be connected. This may seem too extreme for some organizations, so another solution was developed—biometric flash drives which authenticate the user of the flash drive through biometrics. A biometric is any specific and uniquely identifiable physical human characteristic. Biometric flash drives operate by employing a fingerprint scanner on the surface of the drive. The user must swipe his finger over the scanner to gain access to the device.

These flash drives adequately address the problem of restricting access to one person, but they have drawbacks. Firstly, they are much more expensive than regular flash drives and this presents a problem to customers accustomed to buying quantities of cheap flash drives for different uses. Secondly, the biometric device does not prevent the removal of data from a secured location, such as a government building. There is nothing to stop someone from purchasing a biometric flash drive, configuring it to only accept that person's fingerprint, and then steal data just as in the Los Alamos scenario.

Therefore, there is a need for a secure portable storage device to overcome the aforementioned shortcomings of the known art.

SUMMARY OF THE INVENTION

Briefly, according to an embodiment of the present invention, a portable storage device includes: a secure data storage section; a program storage section which includes a security program operatively connected to the secure data section, wherein the security program is operable to selectively enable and disable access to the secure data storage section; a device antenna operable at a low radio frequency not exceeding one megahertz; a transceiver operatively connected to the device antenna, the transceiver operable to receive radio signals at the low radio frequency and generate data signals at the said low radio frequency, in response thereto; a microprocessor operatively coupled with the transceiver and the program storage section, the microprocessor configured for controlling operation of the program storage section and to cause the transceiver to emit an identification signal; and a connector for enabling an electrical connection between the portable device and another device.

The portable device is also configured to be operable at a low radio frequency of 300 kilohertz, and in some instances, as low as 150 kilohertz. The portable device may further include an identification storage section, an energy source, and a squib device.

According to an embodiment of the present invention, a method for monitoring and securing data in a portable storage device within a protected region includes steps or acts of: configuring a signal generating system within the protected region. The signal generating system includes at least one field antenna and a base station operable to generate a low frequency radio signal not exceeding one megahertz. An additional step is to configure the portable device with a low frequency transceiver, an antenna operable at said low frequency, and a security program for secure use within the protected region.

Further, the method proceeds with steps of: monitoring the portable storage device within the protected region; enabling user access to the data in the portable storage device when the portable device is within the protected region; and restricting user access to the data in the portable storage device when the portable devices leaves the protected region.

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 4a is a flow chart of a method for securing data, according to an embodiment of the present invention;

Figure 1:
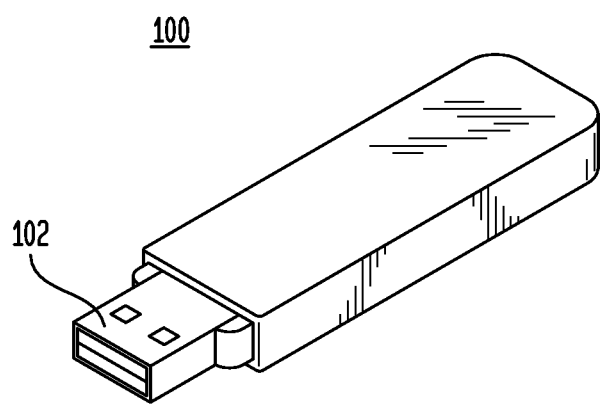
FIG. 1 is an illustration of an exemplary portable device, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

A solution to the problem of unauthorized removal of a portable device from a secure region is discussed with reference to the figures. According to an embodiment of the present invention, a portable device is configured using the RuBee IEEE P1902.1 "RuBee Standard for Long Wavelength Network Protocol" to safeguard data located within a protected area of the portable device. This protected area may be a flash memory data storage integrated circuit. There are many reasons why a user of the portable device or an administrator in an office where the portable device is used may need to have a certain region of the device protected from unauthorized access. For example, the data in the protected region of the device may be of a personal nature, or it may be subject to strict confidentiality and audit trail protocols, such as data in a medical file. The latter reason is most commonly found in governmental offices, the healthcare industry, the military and corporations that do business with the government, hospitals, and/or the military.

The device as will be described herein can be configured as part of a network and can be operable to receive and transmit signals to/from other portable devices within the network. See "Networked Ear Tags for Tracking Animals," application Ser. No. 11/735,959, filed on Apr. 16, 2007. See also "Two-Tiered Networked Identification Cards," Application Ser. No. 60/889,902, filed on Feb. 14, 2007.

The method for securing a portable device as will be described herein enables the protection/tracking/control of portable devices within a secured network, using low frequencies. A secured network is any building, classified site or other region wherein the portable devices may be securely used. The protection/tracking/control capabilities within the secured network are not hampered by any surrounding metal, water and masonry which can interfere with reliable transmissions at high frequencies. To understand how the security features are enabled, we discuss the RuBee™ long wavelength network protocol.

RuBee™ Tag Technology.

Radio tags communicate via magnetic (inductive communication) or electric radio communication to a base station or reader, or to another radio tag. A RuBee™ radio tag works through water and other bodily fluids, and near steel, with an eight to fifteen foot range, a five to ten-year battery life, and three million reads/writes. It operates at 132 Khz and is a full on-demand peer-to-peer, radiating transceiver.

RuBee™ is a bidirectional, on-demand, peer-to-peer transceiver protocol operating at wavelengths below 450 Khz (low frequency). A transceiver is a radiating radio tag that actively receives digital data and actively transmits data by providing power to an antenna. A transceiver may be active or passive.

Low frequency (LF), active radiating transceiver tags are especially useful for visibility and for tracking both inanimate and animate objects with large area loop antennas over other more expensive active radiating transponder high frequency (HF)/ultra high frequency (UHF) tags. These LF tags function well in harsh environments, near water and steel, and may have full two-way digital communications protocol, digital static memory and optional processing ability, sensors with memory, and ranges of up to 100 feet. The active radiating transceiver tags can be far less costly than other active transceiver tags (many under one US dollar), and often less costly than passive back-scattered transponder RFID tags, especially those that require memory and make use of an EEPROM. With an optional on-board crystal, these low frequency radiating transceiver tags also provide a high level of security by providing a date-time stamp, making full AES (Advanced Encryption Standard) encryption and one-time pad ciphers possible.

One of the advantages of the RuBee™ tags is that they can receive and transmit well through water and near steel. This is because RuBee™ operates at a low frequency. Low frequency radio tags are immune to nulls often found near steel and liquids, as in high frequency and ultra high-frequency tags. This makes them ideally suited for use with firearms made of steel. Fluids have also posed significant problems for current tags. The RuBee™ tag works well through water. In fact, tests have shown that the RuBee™ tags work well even when fully submerged in water. This is not true for any frequency above 1 MHz. Radio signals in the 13.56 MHz range have losses of over 50% in signal strength as a result of water, and anything over 30 MHz have losses of 99%.

Another advantage is that RuBee™ tags can be networked. One tag is operable to send and receive radio signals from another tag within the network or to a reader. The reader itself is operable to receive signals from all of the tags within the network. These networks operate at long-wavelengths and accommodate low-cost radio tags at ranges to 100 feet. The standard, IEEE P1902.1™, "RuBee Standard for Long Wavelength Network Protocol", allows for networks encompassing thousands of radio tags operating below 450 KHz.

The inductive mode of the RuBee™ tag uses low frequencies, 3-30 kHz VLF or the Myriametric frequency range, 30-300 kHz LF in the Kilometric range, with some in the 300-3000 kHz MF or Hectometric range (usually under 450 kHz). Since the wavelength is so long at these low frequencies, over 99% of the radiated energy is magnetic, as opposed to a radiated electric field. Because most of the energy is magnetic, antennas are significantly (10 to 1000 times) smaller than ¼ wavelength or ⅒ wavelength, which would be required to efficiently radiate an electrical field. This is the preferred mode.

As opposed to the inductive mode radiation above, the electromagnetic mode uses frequencies above 3000 kHz in the Hectometric range, typically 8-900 MHz, where the majority of the radiated energy generated or detected may come from the electric field, and a ¼ or ⅒ wavelength antenna or design is often possible and utilized. The majority of radiated and detected energy is an electric field.

RuBee™ tags are also programmable, unlike RFID tags. The RuBee™ tags may be programmed with additional data and processing capabilities to allow them to respond to sensor-detected events and to other tags within a network.

RuBee-Configured Portable Device.

Figure 2:
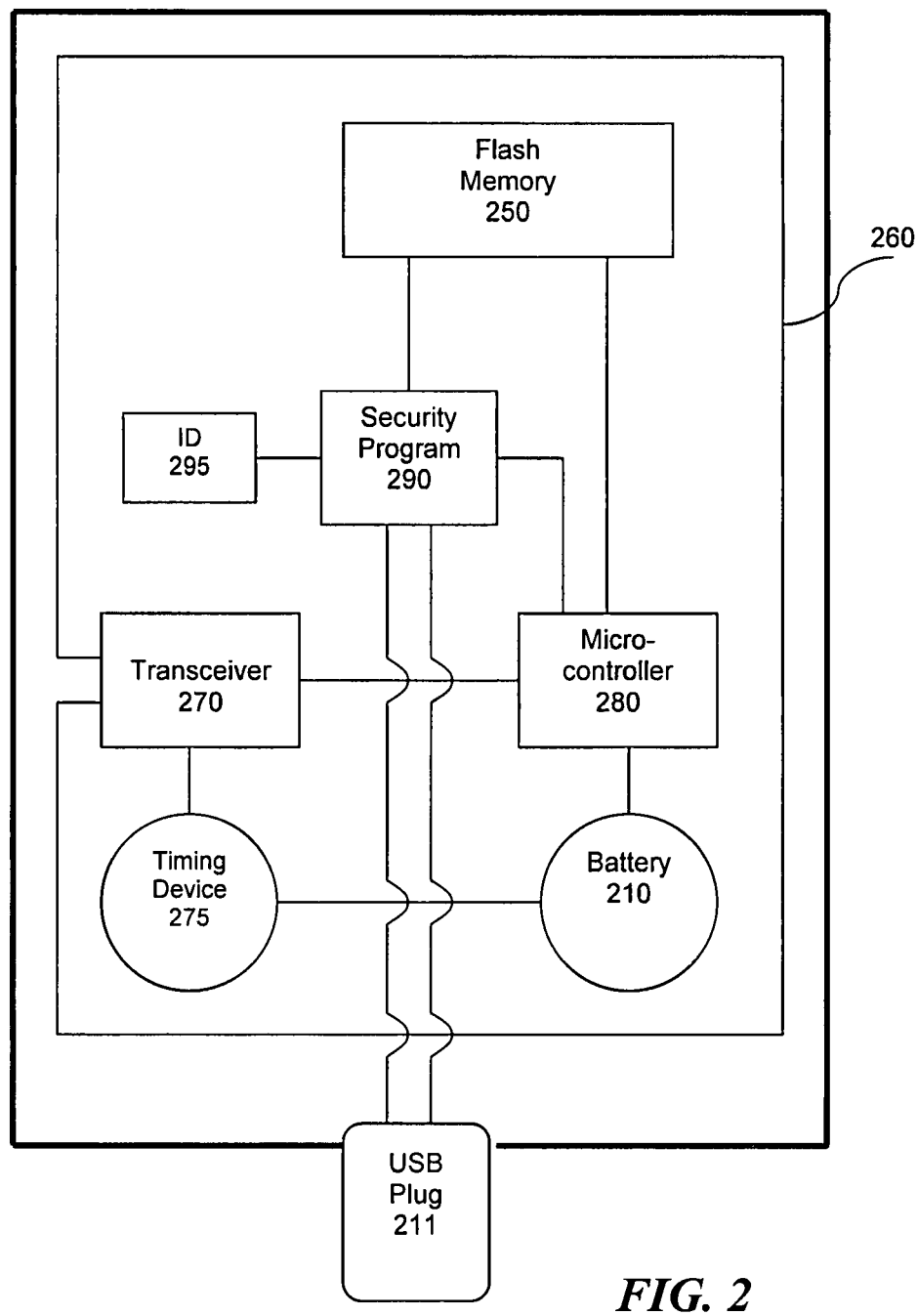
FIG. 2 is a simplified block diagram of a portable device configured to operate according to an embodiment of the present invention.

Referring now in specific detail to the drawings, and particularly FIG. 2, there is illustrated an exemplary portable device 200 according to an embodiment of the present invention. The portable device 200 is a small device, such as a USB flash drive, that is used to store data and transport the data from one information processing system to another. The device 200 includes the following components:

Secure Data Storage Section 250. This component is for storing any data that a user would wish to protect. For example, the secure data section 250 of the device 200 may be a non-volatile storage device such as a flash drive, or an EEPROM (electrically erasable programmable read-only memory); however, any data storage that a user may wish to protect may be considered a secure data section 250.

Device antenna 260. The antenna 260 is a small omni-directional loop antenna with an approximate range of eight to fifteen feet. It is preferably a thin wire wrapped many times around the inside edge of the device housing. A reader or monitor may be placed anywhere within that range in order to read signals transmitted from the device 200.

RuBee™ transceiver 270. The transceiver 270 is operatively connected to the antenna 260 and the microcontroller 280. It may be created on a custom integrated circuit using four micron CMOS (complementary metal-oxide semiconductor) technology. This custom transceiver 270 is designed to communicate (transmit and receive radio signals) through the omni-directional loop antenna 260. All communications take place at very low frequencies (e.g. under 300 kHz). By using very low frequencies the range of the device 200 is somewhat limited; however power consumption is also greatly reduced. Thus, the receiver 270 may be on at all times and hundreds of thousands of communication transactions can take place, while maintaining a life of many years (up to 15 years) for the battery 210. The range of the transceiver 270 can be augmented by the use of field antennas.

A microprocessor or microcontroller 280 controls the operation of the security program 290, controlling the entire operation of the secure data section 250 based on the security program stored in the program storage. The microprocessor 280 may be a standard original equipment manufacture (OEM) microprocessor. The microprocessor 280 controls the flow of data to and from the protected section 250 as allowed by the security program 290. In a standard USB drive, the microcontroller receives flash memory access requests directly through the USB connector 211. By implementing the security program 290 and changing the configuration of the device 200 so that the microcontroller 280 is not operatively connected to the USB connector 211, we provide a novel layer of security between the microcontroller 280 and the USB connector 211. This layer of security is reflected in FIG. 2. Note that the microcontroller 280 of FIG. 2 is not operatively connected to the USB connector 211. Instead, the microcontroller 280 is operatively connected to the transceiver 270, the security program 290, and the flash drive 250.

A security program 290 is operatively connected to the USB connector 211, the flash drive 250, and the microcontroller 280. The security program 290 contains program code instructions to provide security for the flash drive 250. The security program 290 is also enabled for performing program storage checks and updates on the header block information of the flash memory, and transmitting device descriptor information and interface descriptor information for loading a UFI driver to the host computer, and a UFI processing block for generating predetermined UFI response packets. A UFI driver is a protocol adopted for use by USB storage devices. The program code instructions may be customized by a user in order to perform functions including, but not limited to: 1) allow a user to read/write data to the flash drive 250; 2) prevent a user from reading/writing to the flash drive 250; 3) enable the USB connection; 4) disable the USB connection; 5) provide identification data when requested.

The security program 290 may be embodied as program code instructions embedded in a control program commonly found in most portable devices, or it may be a separate application. The security program 290 may be embodied as software only, hardware, or firmware. The security program 290 may be embodied as an application specific integrated circuit (ASIC). There may be more than one security program 290 to handle different security measures. For example, one security program is strictly for disabling the device and one security program monitors access requests.

Figure 5:
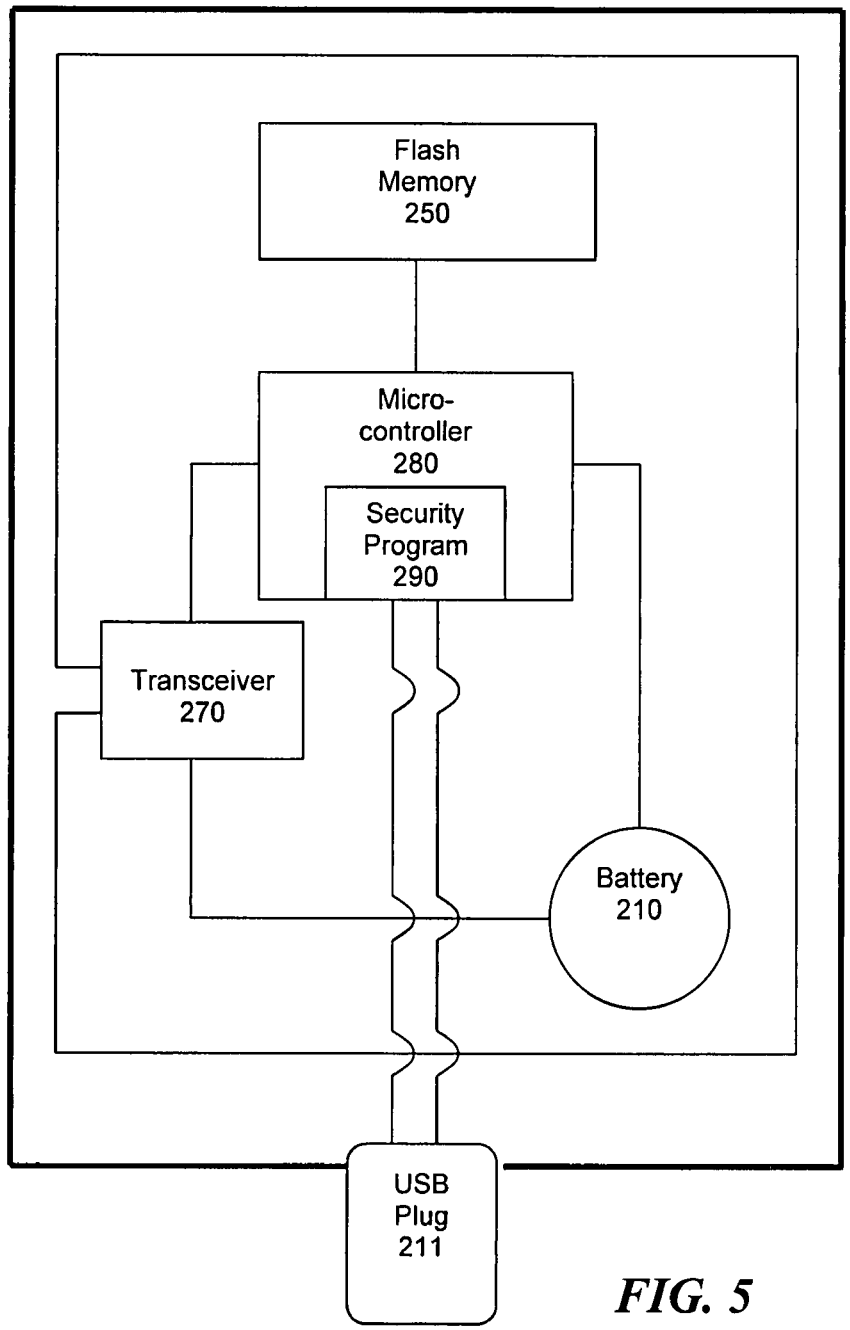
FIG. 5 is a portable device with the security program housed in the microcontroller, according to another embodiment of the present invention.
Figure 6:
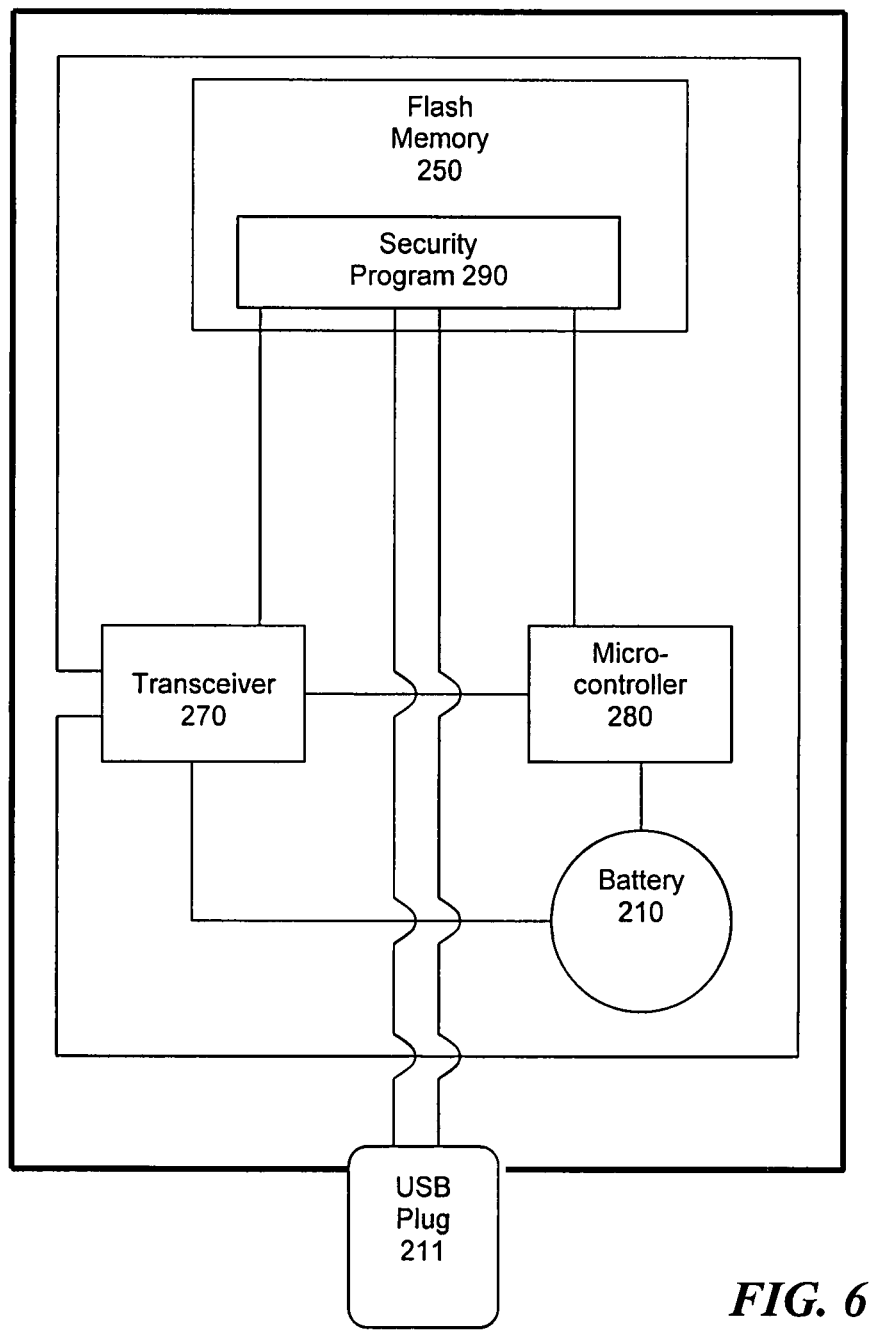
FIG. 6 is a portable device with the security program housed in the flash memory, according to another embodiment of the present invention.

In another embodiment, the security program 290 may be stored in the microcontroller 280, as software, hardware and/or firmware, as shown in FIG. 5. The security program 290 may optionally be stored in the flash drive 250 as shown in FIG. 6, but this is not a preferred embodiment, especially if a squib is used, as will be discussed later. The components may be placed in any number of configurations, keeping in mind the protection of the flash drive 250. An arrangement wherein any flash memory access request coming through the USB connector 211 is intercepted by the security program 290 is the preferred configuration.

The energy source 210 may be a battery (e.g., battery, solar cell, induction coil/rectifier) operable to energize the transceiver 270 and the microcontroller 280. The battery 210 shown in FIG. 2 is preferably a lithium (Li) CR2525 battery approximately the size of an American quarter-dollar with a five to fifteen year life and up to three million read/writes. Note that only one example of an energy source is shown. The device 200 is not limited to any particular source of energy; the only requirement is that the energy source is small in size, lightweight, and operable for powering the electrical components.

A connector 211 is any connector providing electrical contact between two devices for the transmission of data. In FIG. 2 the connector 211 is a USB plug; however, the scope of the invention is not limited to interoperability with a USB connector.

Optional Components.

An optional identification storage element 295 may be included within the security program 290 or operatively connected to the program 290 as shown in FIG. 2. This storage element 295 stores an identification code identifying the portable device 200. The identification code may also optionally identify the organization or project for which the device is being used and/or the device user. The identification code may be hardwired into the storage element 295 or the security program 290 or it may be programmatically inserted as software by the microcontroller 280 after receiving the code signal from a trusted source. This identification code 295 may contain a unique identifier for the device 200 and it may also contain a network identifier.

This identifier is required when communicating within the network of portable devices and in particular so that devices can communicate with each other with some degree of certainty that they are communicating with a trusted device. The transceiver 270 is operable to wirelessly transmit the identification code to a requesting entity such as a monitoring station.

A timing device 275 is used to activate the transceiver 270 at selected time intervals to detect a presence of low frequency radio signals. The timing device 275 may also be used by the transceiver 270 to emit low frequency radio signals at predetermined time intervals.

Figure 7:
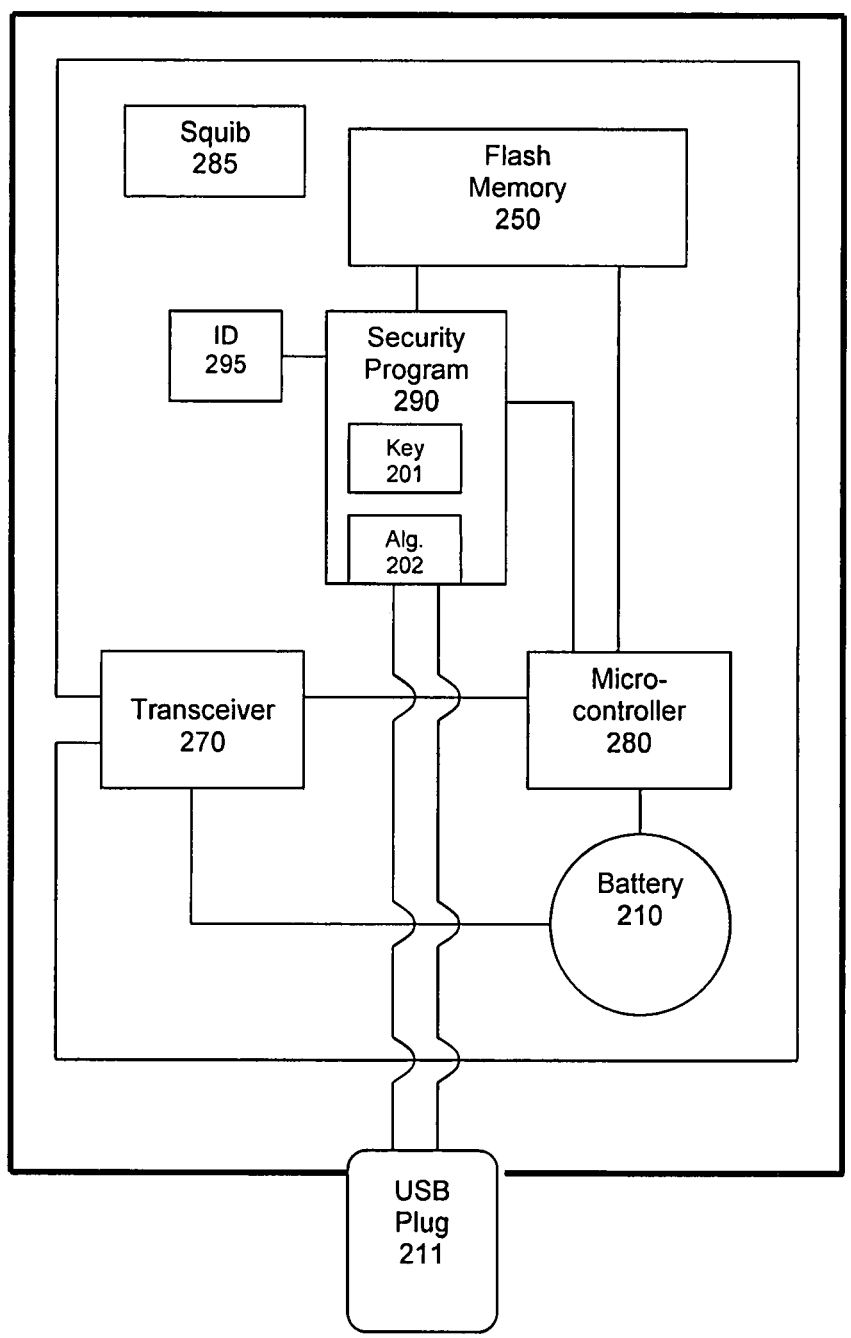
FIG. 7 is a high level block diagram showing an information processing system according to another embodiment of the invention.

A squib device 285 is shown in FIG. 7. A squib 285 in this context is a device for erasing stored data by permanently physically damaging the data storage device 250 using heat. The squib 285, as known to those with knowledge in the art, may be activated by a pulsed electro-magnetic signal from the microprocessor 280, igniting a pyrotechnic material, thus permanently and irrevocably damaging the memory device 250. The microprocessor 280 can be programmed to emit this erase signal when a status event occurs. In this context, a status event may be detection that the device 200 is being removed from a secure area or that the device 200 can no longer be located within the secure area.

Protected Region.

In one embodiment, the device 200 is fully operable when used within a protected region such as a building which is provided with a signal generating system operable to generate a low frequency radio signal not exceeding 1 megahertz throughout substantially the entirety of said protected region by radiating said low frequency radio signal from at least one field antenna which is driven by a base station. See FIG. 3 for an illustration of a protected region. The protected region may be as small as a desk area, a single office or lab, or as large as a multi-building complex. The size of the protected region can be increased exponentially with the addition of field antennas and base stations.

Figure 3:
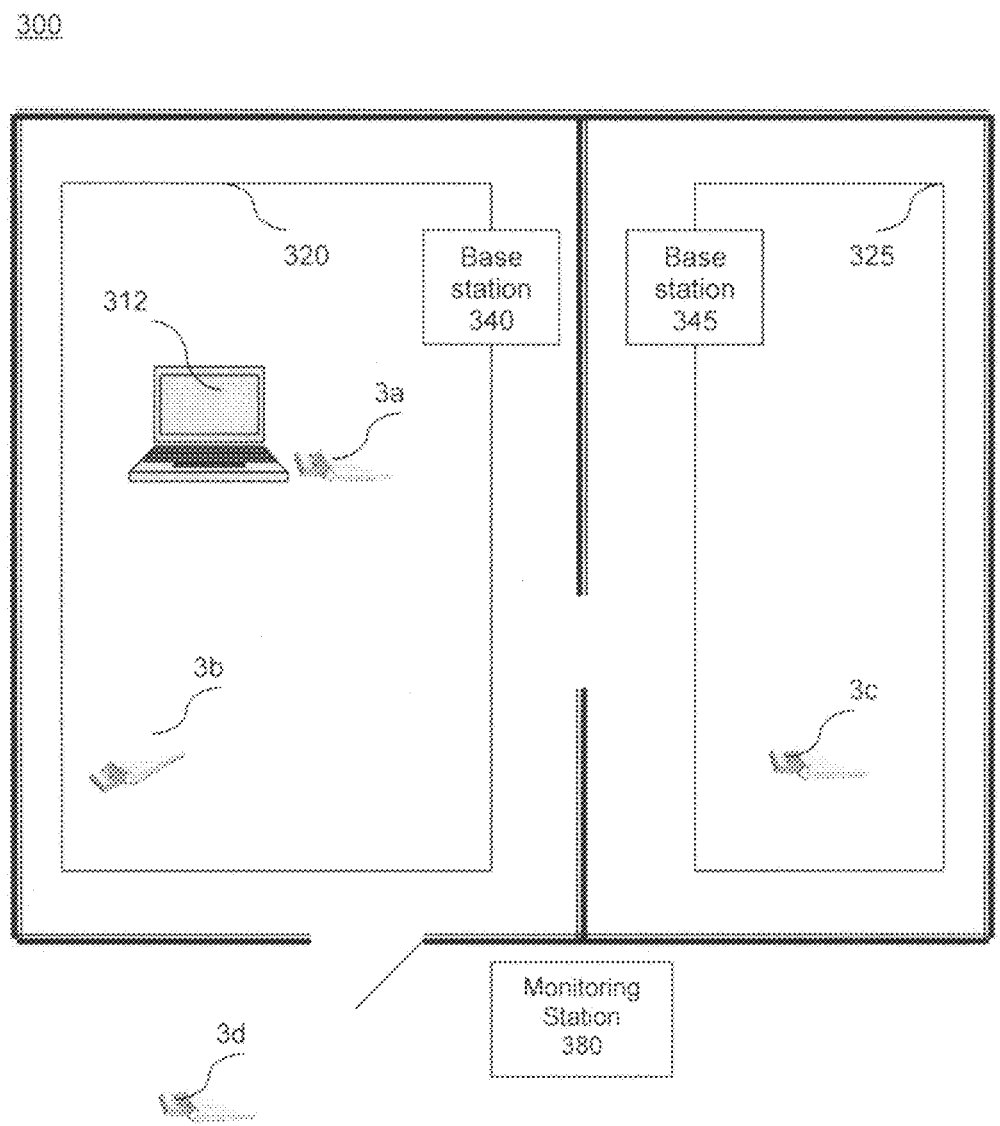
FIG. 3 is a simplified block diagram of a protected region wherein the portable device of FIG. 2 may be advantageously used, according to an embodiment of the present invention.

Referring to FIG. 3 there is shown an exemplary illustration of a protected region wherein the portable device 200 may be advantageously used. In this protected region 300 (shown here as a building) there are four networked portable devices. Three portable devices 3a, 3b, and 3c are shown within the protected region 300. Portable device 3d is shown outside of the protected region 300.

Also shown is a signal generating system that includes field antennas 320 and 325. These field antennas are in communication with base stations 340 and 345. The base stations 340 and 345 generate a low frequency radio signal (less than one megahertz) throughout the entire protected region 300. The protected devices can respond to these signals by emitting radio signals less than 300 megahertz. The number of base stations and field antennas can be increased or decreased depending on the amount of area to protect. The example of FIG. 3 depicts a configuration similar to that which would be used in a medium-size office. Portable device 3a is shown connected to the USB port of personal computer 312. A monitoring station 380 such as a computer with web access monitors the portable devices within the protected region 300. The monitoring station 380 may be located outside of the protected region 300. The status of the protected devices within the secure area 300 may be monitored by security personnel outside of the secure area 300 via an intranet or through the Internet. A server may be used to track all portable devices and issue alerts if a security event is detected, such as the device exiting the secure area 300.

The base station 340, or router, is a custom RuBee™ router. RuBee™ routers are designed to read data from multiple antennas at a low frequency. The base station 340 may be configured with a built-in GPS unit, two USB ports, a serial port and high-speed Ethernet connection for communication with a central data processor or monitoring station 380. This configuration has the added benefit that not only does it track and protect the portable devices, but it can enable the data stored in the portable devices 3a, 3b, 3c, and 3d to be accessed remotely via a web-enabled computer 380. At any point in time, data stored in any of the portable devices within the network can be accessed real-time through a web browser. One with knowledge in the art can understand that the data may also be encrypted and/or password-protected so that only authorized users may access the data through the web browser. The data can be protected by assigning a personal identification number (PIN) so that only those users with the PIN can access the data. Alternatively, the data may be encrypted with Advanced Encryption Standard (AES) encryption. Only authorized personnel would have the key to decrypt the data.

Figure 9A:
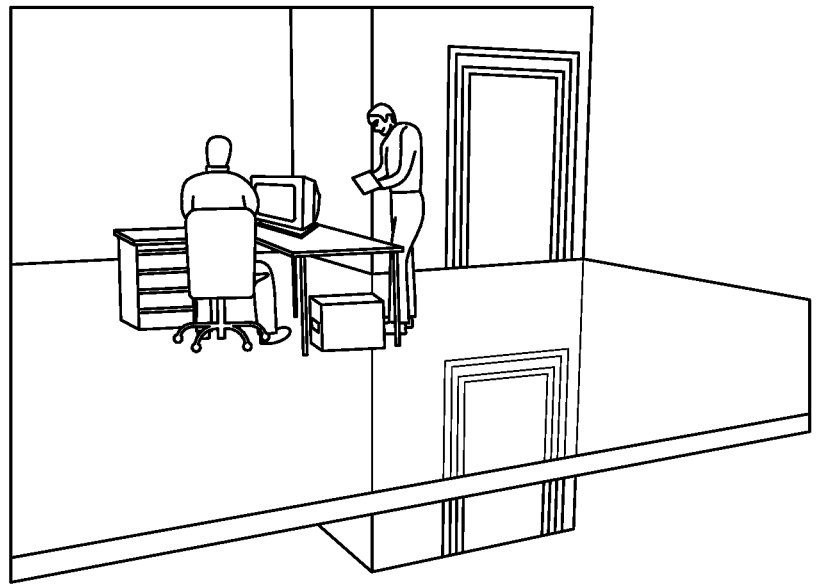
FIG. 9a shows placement of an antenna, according to an embodiment of the present invention.
Figure 9B:
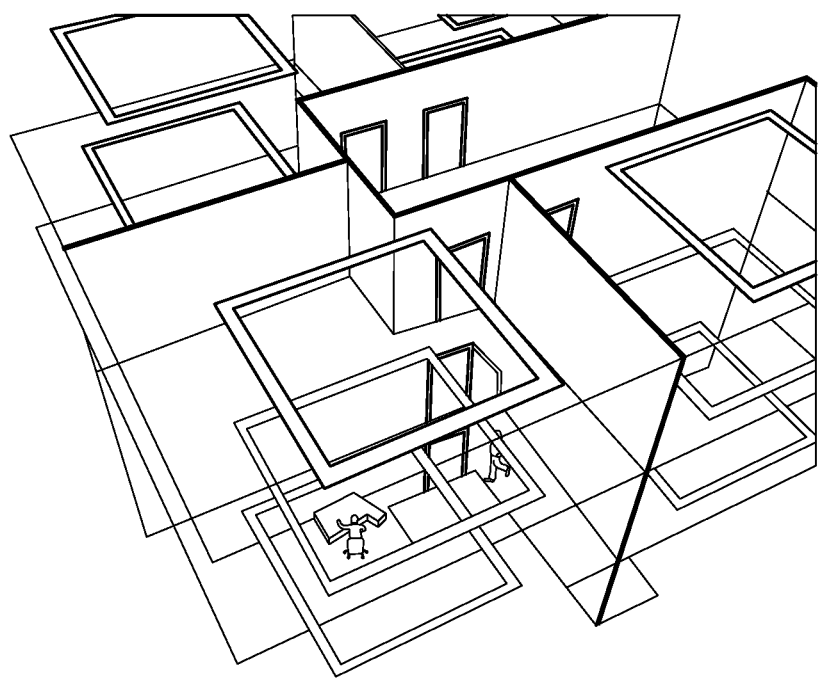
FIG. 9b shows another placement of an antenna, according to an embodiment of the present invention.

The field antennas 320 and 325 which are shown placed around the perimeter of an interior office in FIG. 3, can optionally be placed around a doorway, as shown in FIG. 9a. In another embodiment as shown in FIG. 9b, the antenna may be placed horizontally either on a floor or ceiling within a building or even an outdoor area. The RuBee™ low frequency signals are ideal for this configuration because the metal in door jambs or walls will not interfere with the signals as they would with RFID.

Method Embodiments.

Referring to FIG. 4a there is shown a flow chart 400 detailing a process of securing data in the protected region 300 according to an embodiment of the present invention. The first two steps of the method can be performed in any order. The ordering is not important. Step 410 is to configure a portable device with a low frequency radio transceiver 270, an antenna 280, and a security program 290. The device antenna 280 is operable to receive low frequency signals from the base stations 340 and 345.

Step 420 sets up at least one base station and at least one field antenna in a region to be protected. Any area surrounded by a field antenna is considered a protected region. The field antenna may be a loop antenna placed horizontally on the ground, on the ceiling, or around shelving or other structures. The field antenna may also be placed vertically, perhaps along a column or a room divider.

In step 430, the portable device 3a receives wireless signals through its antenna 270 from base station 340. The base station 340 may continually radiate interrogation signals followed by a listening interval. In another mode the base station 340 radiates interrogation signals intermittently, in burst mode. The signals may be requesting identification information 295 from the portable device 3a. The device 3a receives an interrogation signal which it has been preprogrammed to accept. The device 3a responds to the interrogation signal with a preprogrammed response. The response may simply be an acknowledgment signal or some identifying information.

In step 440 devices within range of the interrogation signal respond to the interrogation signal. If the signals from the portable devices are found to be acceptable, then nothing occurs and the process loops back to step 430. If, however, the base station 340 receives an incorrect response or no response at all from any of the portable devices, then in step 450 the base station transmits a signal to a monitoring station 380. The monitoring station 380 may then disable any access to the flash drive of the non-responding portable device in step 460. Note that step 450 is an optional step. The station 380 may be programmed to immediately cause the device 200 to be disabled if no response is received, or if the correct response is not received, bypassing the step of notifying the monitoring station 380.

The flash drive 250 may be disabled remotely and wirelessly by activating a squib 285 sensitive to electromagnetic signals, as discussed earlier. The squib 285 destroys the stored data when activated. Therefore, any removal of the device 200 from a protected area 300 causes the device 200 to become useless.

Figure 4B:
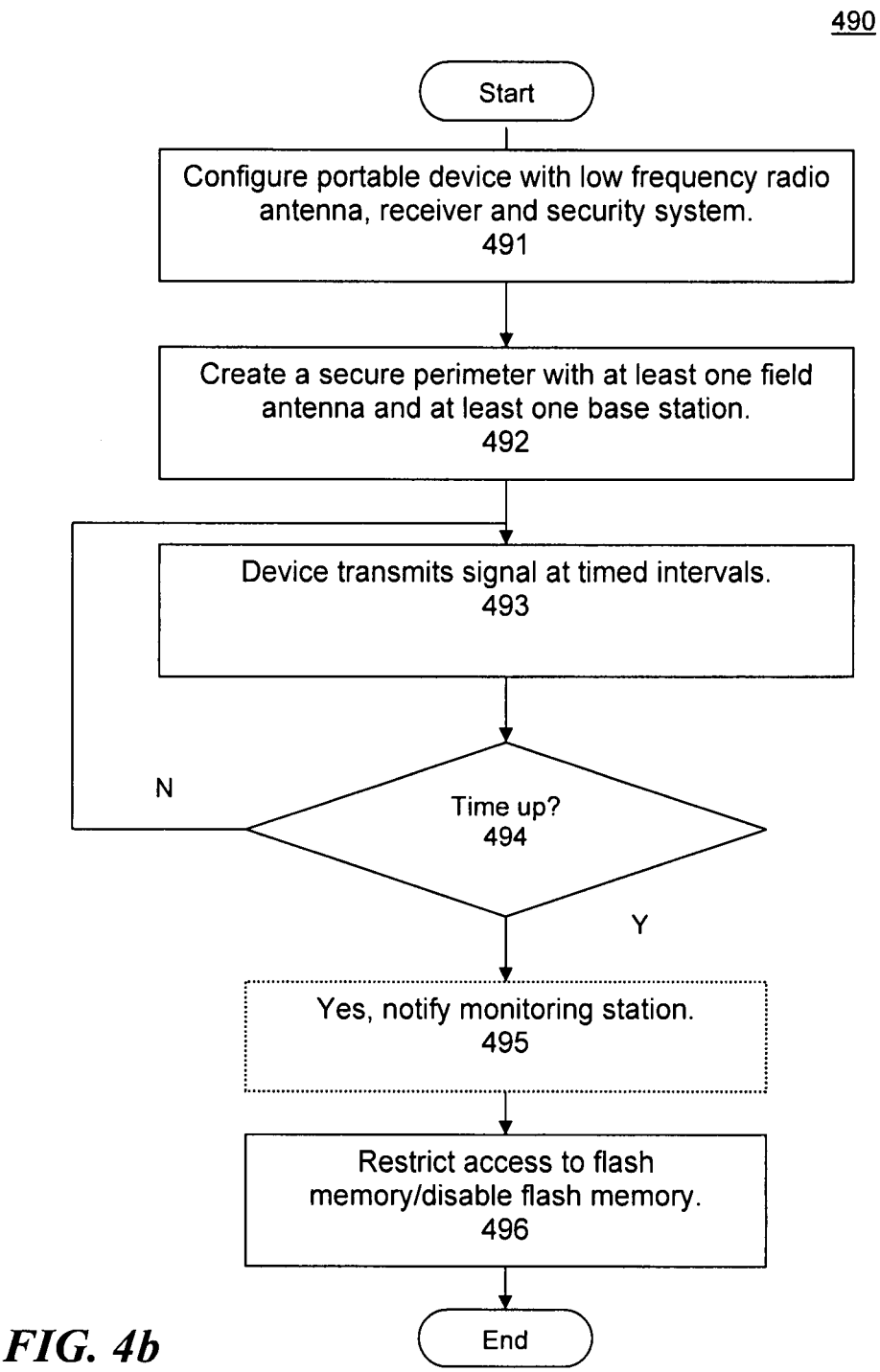
FIG. 4b is a flow chart of an alternate method for securing data, according to an embodiment of the present invention.

Referring now to FIG. 4b, we provide a flow chart 490 representing an alternate method for securing data in the portable device 200. In this embodiment, the first two steps 491 and 492, are the same as the first two steps of FIG. 4a. In step 493, the device 200 emits a low frequency identification beacon signal at timed intervals. The low frequency signals under 150 kHz are picked up by the field antennas. The beacon signal emitted from each device provides identity information (which may or may not be encoded). This information can be stored or displayed by the monitoring station 380.

The transmission may be timed using the timing device 275. This signal is picked up by the base station 340. The base station 340 is programmed to expect the beacon signal at certain intervals. The base station 340 also has a timer synchronized with the timer 275 of the device 200.

In step 494 if the pre-determined period of time has elapsed and no signal has been received from the device 200, then in step 495 the base station 340 will notify the monitoring station 380 to disable the device 200. In step 496 the device is disabled. Just as in FIG. 4a, the step of notifying the monitoring station 380 is an optional step.

The beacon signal can provide identifying information for the portable device. Using directional antennas and a GPS system, the specific location of the device 200 can be computed. This information may be sent to the monitoring station 295 or to a security system where it is stored.

In either of the embodiments shown in FIGS. 4a and 4B, a simple timing method can be used to assure that the device 200 remains active only within the protected region 300. The device 200 may be pre-programmed to remain "on" for a preset interval of time, perhaps 30 seconds, powered by a signal from the base station 340 instructing a flag to be set or re-set in the processor 280. Once this interval of time elapses, the device is automatically powered down (the battery is deactivated). This embodiment may be the easiest to implement because it does not require the use of a monitoring station, just the strategic placement of field antennas and a base station. While the device 200 remains in the protected region 300, which means it is within range of the base station 340, it will continue to receive the "on" signal from the base station 340. Once the device 200 leaves the protected region 300 it is no longer within range of the base station 340, therefore it cannot receive the "on" signal and powers off after a preset interval of time.

The choice of radio frequencies for transmitting and receiving in the secure region is important. A low RF frequency such as 150 kHz can be used for the interrogation signal at the base stations to prevent interference from metals and liquids which may be present in the protected region. Operating at such a low frequency allows for transmission of signals in harsh environments. The device 200 may use the lower frequency (150 kHz) to emit signals to the field antennas or to other devices.

Figure 8:
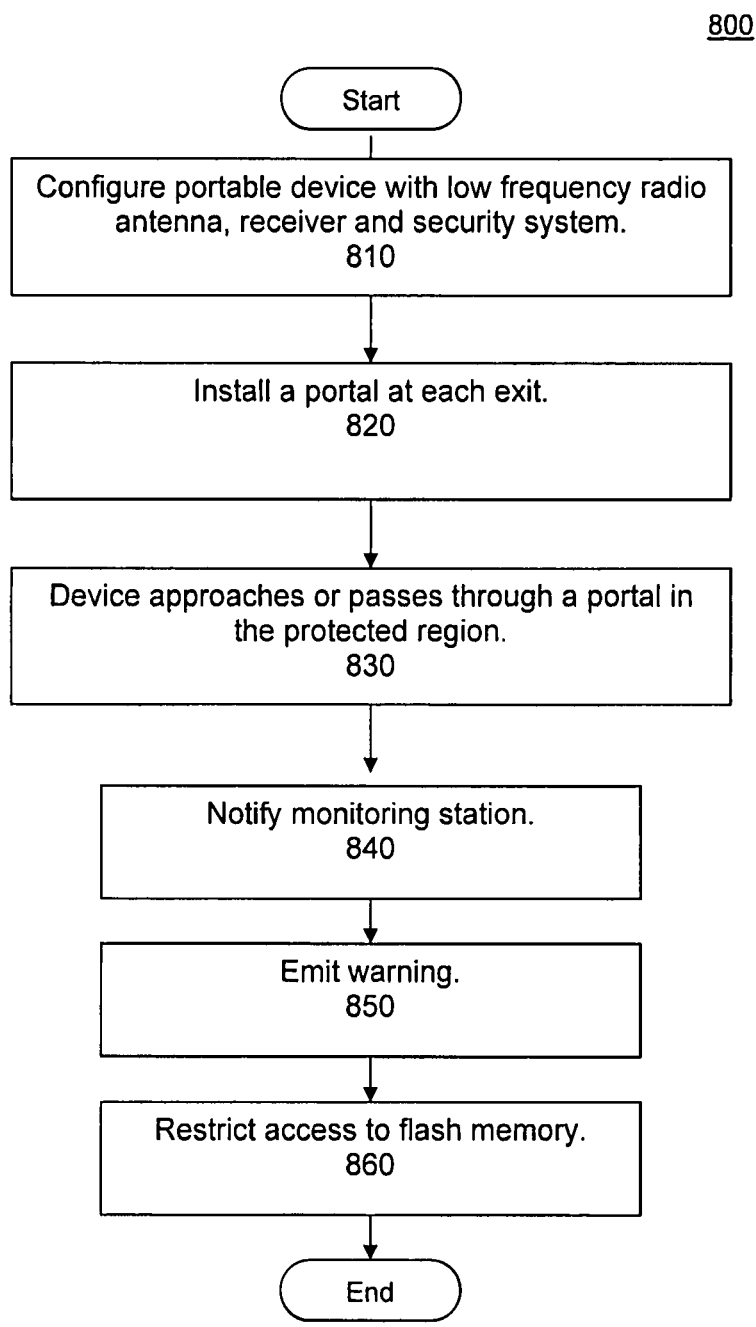
FIG. 8 is a flow chart of a method for securing data, according to another embodiment of the present invention.

Referring now to FIG. 8 there is shown a flow chart detailing a method of exit control according to another method embodiment of the present invention. In the method 800 of FIG. 8, the first step 810 is the same as step 410 of FIG. 4a. In step 820 a visibility portal is installed at each exit to the protected region. In step 830 the portable device passes through the portal or approaches the portal. Next, in step 840 the monitoring station 380 or computer receives a transmission that the device is exiting the secure area.

At this point, in optional step 850, an audio/visual system located within the portal may be prompted to deliver a warning to the person carrying the portable device. The warning may be in the form of an audio alert, such as "Warning! Leaving restricted area" or a text display, flashing light, or any other attention-getting presentation. If the portable device 200 continues to exit the protected region, access to its secure data storage section 250 is disabled in step 860. The device 200 itself may emit a warning signal when within range of the portal. The device 200 may be programmed to emit a warning signal when attempting to download material in area where access is restricted or if the device 200 is removed from the monitored area 300.

Disabling the data storage section 250 may involve firing a squib 275 or actively deleting the files in the memory device by an instruction from the microprocessor 280.

There are many circumstances where it may be practical to restrict access to the secure data region without destroying the data. One way to do this is to restrict access to the data by requiring the user to provide a security code. The security code can then be changed without the user's knowledge if the device 200 leaves the protected region 300. Another way to do this is to periodically update the security code and transmit it to the portable device 200 only if the portable device 200 answers an interrogation signal.

Another way to restrict data access without destroying the data is easily done by using a conventional encryption/decryption method. Referring again to FIG. 7, an administrator generates a key and then provides a copy 201 of that key to the portable device 200. The key 201 may be stored in the security program area 290, along with the encryption algorithm 202 used to encrypt the data. The data is automatically encrypted as it is loaded into the flash drive 250. The key 201 is available to automatically decrypt the data while the device 200 is within the protected region 300. If the device 200 leaves the protected region 300, a signal is sent to the microprocessor 280 to destroy the key 201. The data itself is still safe within the device 200. At this point only the administrator is able to access the data, using the original key. Another way to keep track of the portable device 200 is by using global positioning system (GPS) signals.

Figure 10:
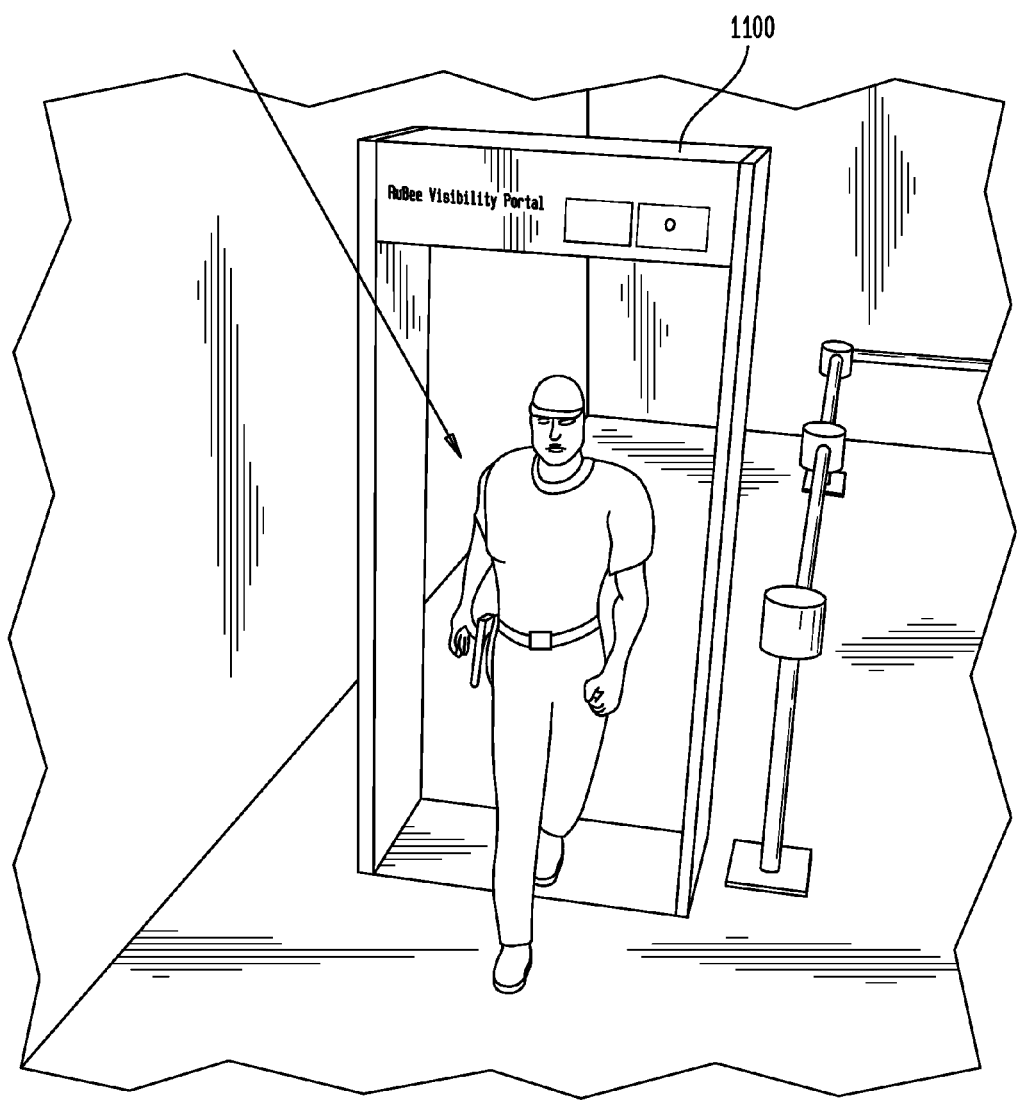
FIG. 10 shows a free-standing portal for exit control, according to an embodiment of the present invention.
Figure 14:
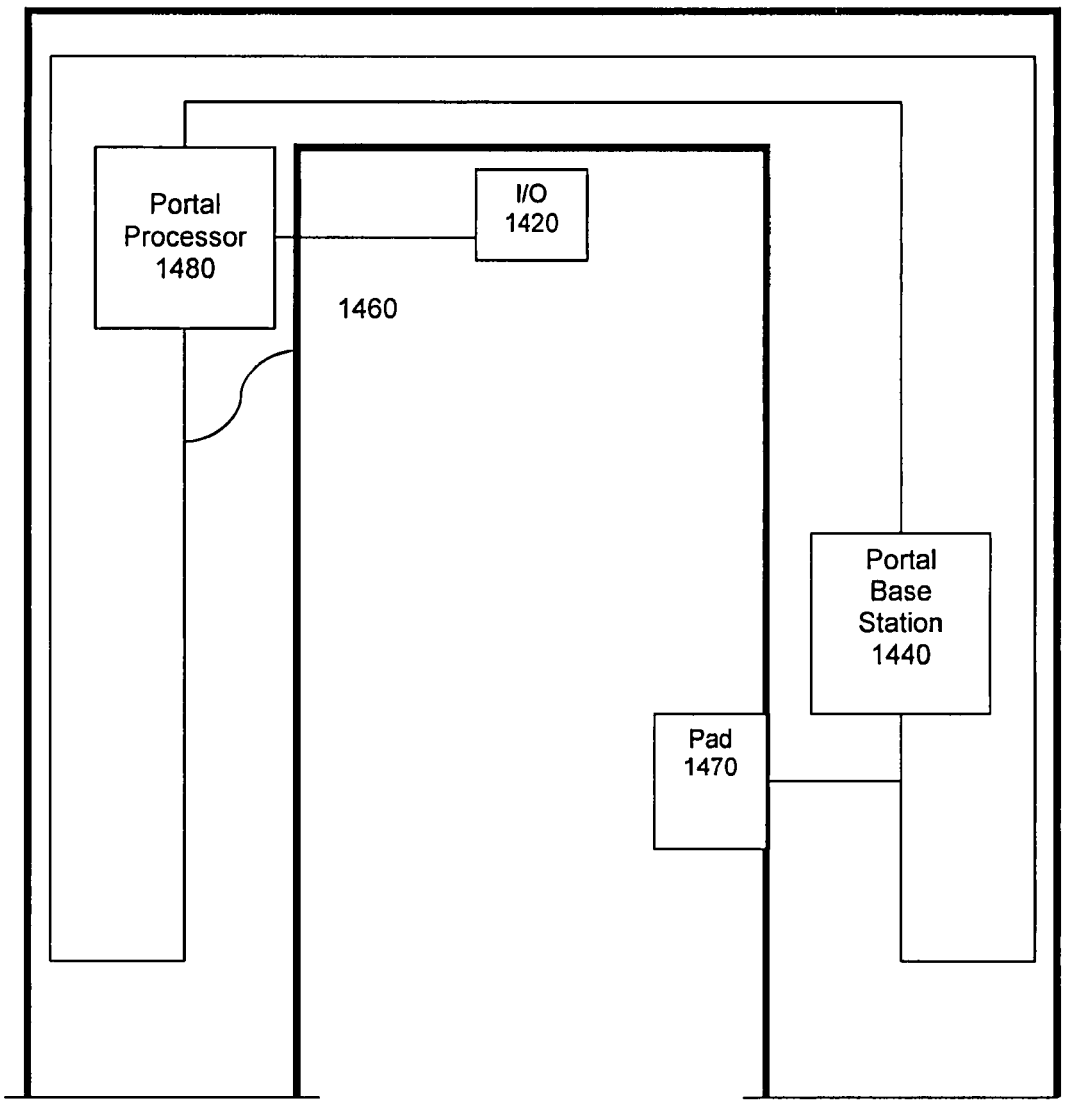
FIG. 14 is a simplified diagram of components of a portal configured to operate according to an embodiment of the present invention.

A standard visibility portal configured to read signals emitted from the portable device is shown in FIG. 10. FIG. 10 shows a stand-alone walk-thru portal 1100 configured to read data from a portable device. In this embodiment using the portal 1100, one would simply set up a portal 1100 at each exit location. The components of the portal 1100 are shown in FIG. 14. The portal housing holds a loop antenna 1460 plus a base station 1440 and a small computer 1480, such as an ARM®-based RISC (reduced instruction set computer) processor. The ARM®-based processor may be physically connected to a computer network within the facility 300 via standard RJ45 connectors to send and receive messages. It may also be operatively connected via wireless transmissions. Affixed to the portal housing is a pad 1470 acting as a transceiver, operable to pick up signals from a device and also to transmit signals to a device within range. As an individual carrying a portable device 200 passes through the portal 1100, the portal, or reader, is able to identify the portable device 200 as a restricted device.

The portal 1100 may be configured such that it detects the proximity of a portable device 200 and emits a warning signal. The portal 1100 may optionally contain an input/output device 1420 such as a display screen, or an audio device. The warning signal may be picked up by a monitoring station which would then take action. Alternatively, the portal itself may act as a monitoring station and take whatever action is necessary, such as broadcasting a warning message that a portable device 200 is about to leave the secure area. The monitoring station or the portal could also transmit a signal to cause access to the data in the portable device to be disabled. The step of issuing a warning signal may be bypassed and instead, data access may be instantly disabled once the portable device passes through the portal. This may be accomplished by transmitting or failing to transmit an instruction to set (or re-set) a flag in the processor that permits the device to remain functional. The portal may be a unipolar portal, as shown and discussed in "Firearm Visibility Network," U.S. Application Ser. No. 60/913,656.

Figure 13:
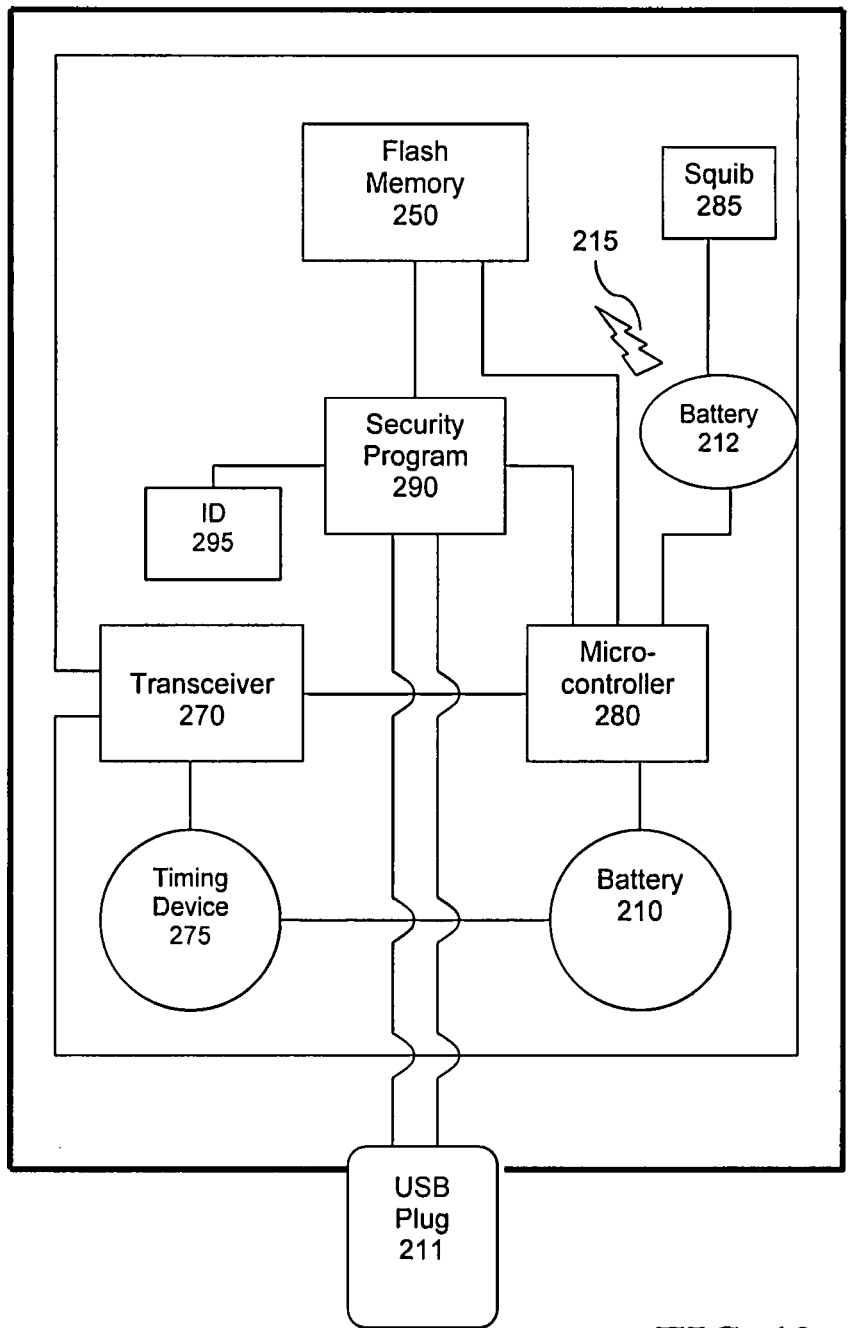
FIG. 13 is a portable device with an additional battery, according to an embodiment of the present invention.

Alternatively, the device 200 may contain a separate battery 212 as shown in FIG. 13 This battery 212 remains off until it is activated by the microprocessor 280 configured to receive a specific signal. Once this battery 212 has been activated by the microprocessor 280, the battery 212 either operates a squib device 285 or sends a high voltage signal 215 to the flash drive 250, destroying the data. The device 200 is operable to receive a plurality of signals to allow the microprocessor to drive many input/output devices, including one to start a data delete response. These signals may be transmitted at different radio frequencies. One radio frequency may be reserved for a data erase directive, one radio frequency may be used for an identification signal, while another radio frequency is used for all other directives. The portable device 200 is operable to receive radio frequency signals varying in strength, some as low as 150 kHz.

You will recall that an optional ID section 295 of the portable device contains data identifying the device, the user of the device, and/or the organization that owns the device. Data from this ID section 295 could be read by the portal 1100. In this manner information about the device 200 and/or the individual carrying the device 200 could be transmitted to a monitoring station and/or remote computer.

Figure 11:
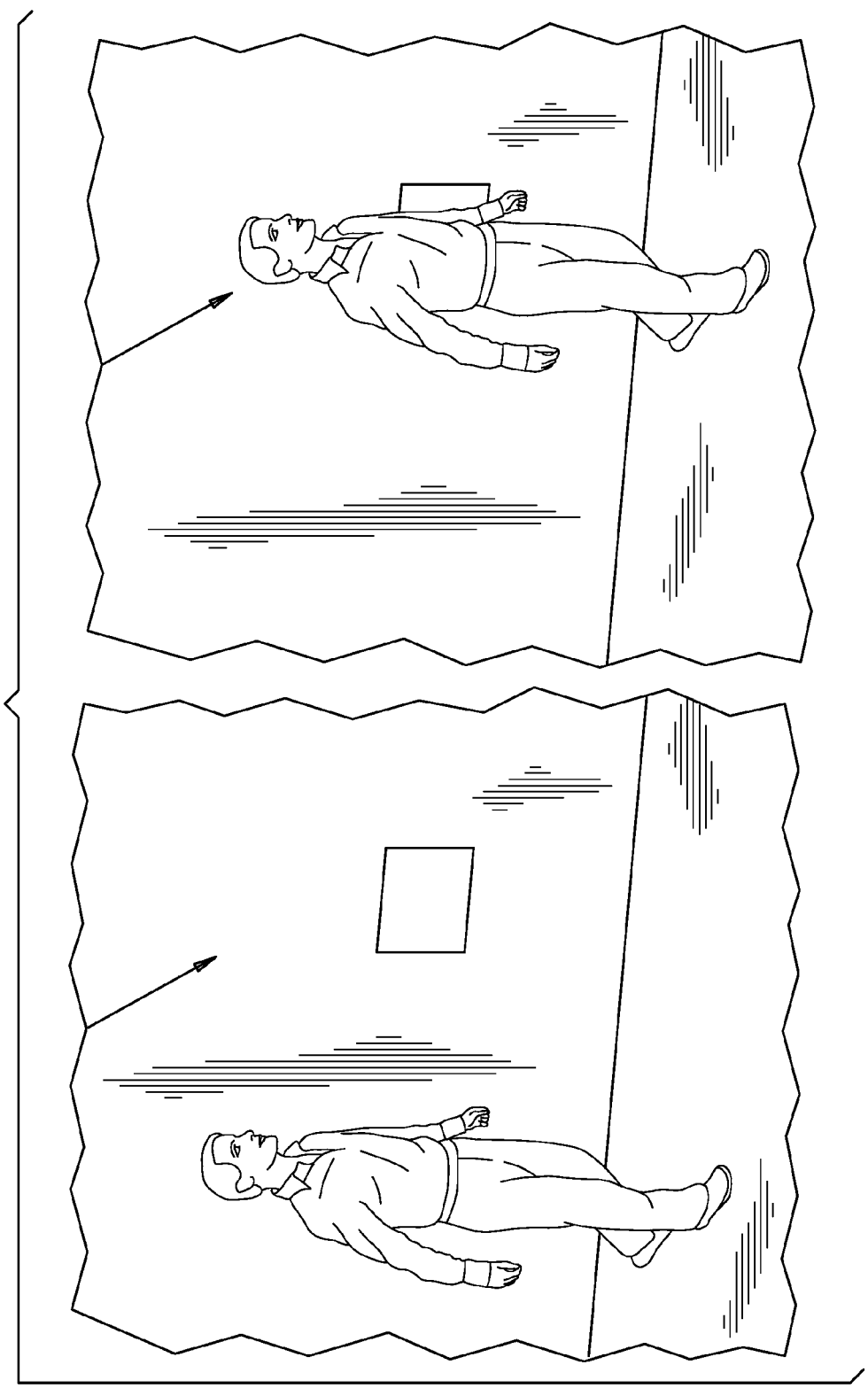
FIG. 11 shows a wall-mounted portal for exit control, according to an embodiment of the present invention.

FIG. 11 shows a wall-mounted portal configured to read data from the portable devices. The advantage of the wall-mounted portal as shown in FIG. 11 is that it is inexpensive and very easy to set up.

Figure 12:
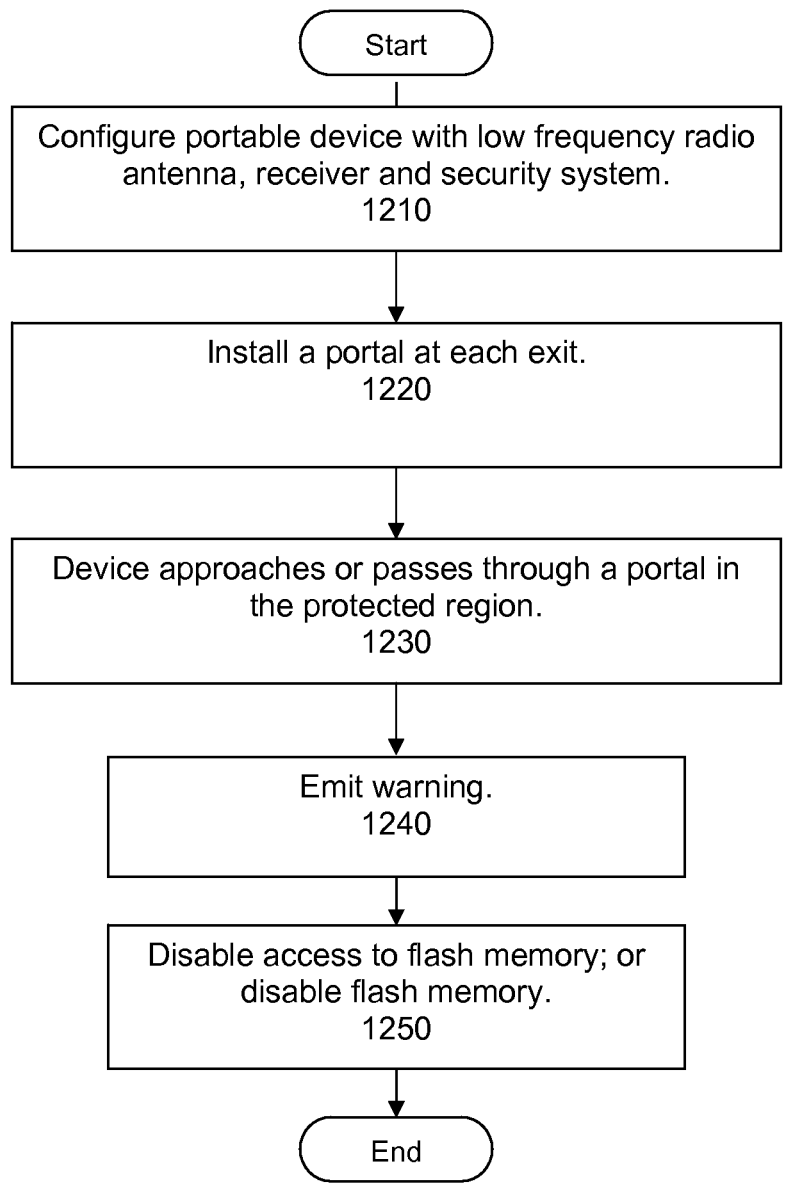
FIG. 12 is a flow chart of a method for exit control using a portal, according to an embodiment of the present invention.

Referring now to the flow chart of FIG. 12 we discuss an alternate method of exit control using a portal. The first step 1210 is to configure the portable device. This step involves either configuring the portal with a RISC processor already pre-loaded with instructions, or programming the processor after it is installed. Next, a portal is installed at each exit to a secure area. In step 1230 a device approaches or passes through the portal, indicating that the device is leaving the secure area. An optional step 1240 of emitting a warning to the holder of the device may be incorporated in this process. This optional warning is used for an individual mistakenly leaving the secure area with a portable device. After the warning is transmitted, the individual is given a small interval of time (perhaps three seconds) to retreat back into the protected region. If the device is still within the portal area after the warning interval, the device data access is disabled. Perhaps the data itself may be erased. If no warning signal is given, the portal automatically transmits a signal to disable the device. This can be done by disabling the battery 210 in the portable device 200. The portal interrogation signal itself may optionally be set as a burst mode signal with a voltage high enough to disable the battery 210.

Therefore, while there have been described what are presently considered to be the preferred embodiments, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A portable data storage device comprising:
a secure data storage section;
a program storage section comprising a security program operatively connected to the secure data storage section, wherein the security program is operable to selectively enable and disable access to the secure data storage section;
a device antenna operable at a low frequency not exceeding one megahertz;
a transceiver operatively connected to the device antenna, the transceiver operable to receive radio signals at the low radio frequency and generate data signals at the said low radio frequency, in response thereto;
a programmable microprocessor operatively coupled with the transceiver and the program storage section, the microprocessor configured for controlling operation of the program storage section and to cause the transceiver to emit an identification signal;
a connector for enabling an electrical connection between the portable device and another device, wherein the connector and the secure data storage section are not operatively connected; and
a heat-generating device for causing erasure of data in the data storage section and wherein the microprocessor is further configured for actuating the heat-generating device in response to receiving an erase signal.

2. The portable device of claim 1, wherein the low radio frequency does not exceed 300 kilohertz.

3. The portable device of claim 2, wherein some of the signals are transmitted at a low radio frequency not exceeding 180 kilohertz.

4. The portable device of claim 1, further comprising an identification storage section operatively connected to the program storage section, the identification storage section comprising identification data about the portable device, the identification data comprising a unique identifier associated with said portable device.

5. The portable device of claim 4, wherein the identification data comprises an internet protocol address, and wherein the microprocessor is operable for communication with an internet router using said internet protocol address, such that at least a portion of the identification data can be transmitted through the internet router to be viewable through a web browser at a remote location.

6. The portable device of claim 4 wherein the identification data is inserted by the microprocessor upon receipt of a directive sent as a signal from a trusted source.

7. The portable device of claim 6 further comprising an additional energy maintained in sleep mode until activated by the microprocessor and when activated, said additional energy source causes erasure of data in the secure data storage section.

8. The portable device of claim 4 wherein the portable device is networked and the identification storage section further comprises network identification data.

9. The portable device of claim 8 wherein the portable device is operable to transmit and receive signals from other portable devices within its network.

10. The portable device of claim 1 wherein the transceiver is operable to emit a warning signal when the portable device is being removed from a protected region.

11. The portable device of claim 1 further comprising an energy source.

12. The portable device of claim 1 wherein the security program is embodied as an application specific integrated circuit.

13. The portable device of claim 1 wherein the security program is embodied within the microprocessor.

14. The portable device of claim 1 wherein the security program is disposed within the secure data storage section.

15. The portable device of claim 1 wherein the secure data storage section is an electrically erasable programmable read-only memory device.

16. The portable device of claim 1 wherein the connector is based on a USB standard.

17. The portable device of claim 1 further comprising a timing device operatively connected to the transceiver, the timing device operable to activate said transceiver at selected time intervals.

18. The portable device of claim 1 wherein the heat-generating device is detonated by a signal from the microprocessor, said signal transmitted if the portable device is removed from the protected region.

19. A method for monitoring and securing data in a portable data storage device within a protected region, the method comprising the steps of:

configuring a signal generating system within the protected region, the signal generating system comprising at least one field antenna and a base station operable to generate a low frequency radio signal not exceeding one megahertz;

configuring the portable storage device with a low frequency transceiver, an antenna operable at said low frequency, and a securing program for secure use within the protected region;

monitoring the portable storage device within the protected region;

enabling user access to the data in the portable storage device when the portable storage device is within the protected region; and restricting user access to the data in the portable storage device when the portable device leaves the protected region.

20. The method of claim 19 wherein configuring the signal generating system comprises installing a portal comprising the base station, a loop antenna, and a processor.

21. The method of claim 20 wherein the step of restricting user access comprises the portal emitting a warning when the portable storage device is in close proximity to the portal.

22. The method of claim 19 wherein restricting user access comprises at least one action selected from a group consisting of: erasing data, destroying the secure data storage section, changing a security code, destroying a decryption key, powering down the portable storage device and placing the portable storage device in sleep mode.

23. The method of claim 22 wherein configuring the portable device comprises loading an encryption/decryption program in the device, along with a key, and restricting user access further comprises transmission of a signal to the microprocessor causing said microprocessor to destroy the key.

24. The method of claim 22 wherein restricting user access comprises requiring the user to provide a security code transmitted by the base station and changing said security code if the portable device is removed from the protected region.

25. The method of claim 24 wherein the security code is updated periodically and wherein the updated security code is transmitted to the portable device only if the portable device is within the protected region.

26. The method of claim 19 wherein configuring the portable storage device further comprises installing a heat-generating device in the portable storage device, said heat-generating device operable by the microprocessor, wherein the erasure of the data in the portable storage device is accomplished by activating the heat-generating device to release energy sufficient to destroy the data, and wherein the heat-generated device is activated when the portable storage device is removed from the protected region.

27. The method of claim 26 wherein the heat-generating device is activated by the microprocessor to emit a high voltage electro magnetic signal causing erasure of the data in the portable storage device when the portable storage device is removed from the protected region.

28. The method of claim 19 wherein the base station transmits interrogation signals to the portable storage device and waits for a timely response from the portable storage device, and wherein user access to the portable storage device is restricted when the timely response is not received from the portable device.

29. The method of claim 28 wherein the interrogation signals are transmitted periodically.

30. The method of claim 19 further comprising transmitting interrogation signals to the portable storage device with the at least one field antenna.

31. The method of claim 19 further comprising using the portable storage device for transmitting identification signals to the base station at timed intervals and if the base station fails to receive an identification signal at the timed interval, the base station transmits a signal restricting access to the data.

32. The method of claim 19 wherein the portable storage device is configured to emit a warning signal when it is removed from the protected region.

33. The method of claim 19 wherein configuring the protected region comprises a step of delineating a secure perimeter of the protected region by placing the at least one field antenna around the protected region.

34. The method of claim 33 further comprising a step of expanding the secure perimeter of the protected region by adding an additional field antenna and an additional base station.

35. The method of claim 19 wherein configuring the portable device further comprises installing a battery in the portable device, said battery in a sleep state until activated by the microprocessor, wherein activating the battery causes a release of energy, the energy destroying the data.

36. The method of claim 35 wherein configuring the portable storage device comprises installing a squib device and wherein the battery activates the squib device, said squib device releasing heat to destroy the data.

37. The method of claim 19, further comprising a step of locating the portable storage device by using global positioning system signals.

38. The method of claim 19, wherein configuring the portable storage device comprises installing a timing device and setting the portable storage device to go into a sleep mode after a predetermined interval of time unless a "power on" signal is received from the base station.

* * * * *